United States Patent
Miyagishima (10) Patent No.: US 10,541,908 B2
(45) Date of Patent: Jan. 21, 2020

(54) COMMUNICATION RELAY APPARATUS AND SETTING METHOD

(71) Applicant: YAMAHA CORPORATION, Hamamatsu-shi (JP)

(72) Inventor: Satoshi Miyagishima, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/782,194

(22) Filed: Oct. 12, 2017

(65) Prior Publication Data

US 2018/0109442 A1 Apr. 19, 2018

(30) Foreign Application Priority Data

Oct. 14, 2016 (JP) .................................. 2016-202188

(51) Int. Cl.
| | |
|---|---|
| *H04L 12/891* | (2013.01) |
| *H04L 12/709* | (2013.01) |
| *H04L 12/721* | (2013.01) |
| *H04L 12/937* | (2013.01) |
| *H04L 12/801* | (2013.01) |
| *H04L 12/851* | (2013.01) |

(52) U.S. Cl.
CPC ............ *H04L 45/245* (2013.01); *H04L 45/38* (2013.01); *H04L 47/41* (2013.01); *H04L 49/253* (2013.01); *H04L 47/193* (2013.01); *H04L 47/2441* (2013.01)

(58) Field of Classification Search
CPC .................................................. H04L 45/245
See application file for complete search history.

(56) References Cited

U.S. PATENT DOCUMENTS

| | | | |
|---|---|---|---|
| 6,532,229 B1 | 3/2003 | Johnson et al. | |
| 2004/0264700 A1* | 12/2004 | Kirkland | H04L 12/4625 380/270 |
| 2012/0300773 A1 | 11/2012 | Maeda et al. | |
| 2014/0126424 A1* | 5/2014 | Nguyen | H04L 49/25 370/255 |
| 2015/0235337 A1* | 8/2015 | Petrick | G06F 1/16 345/504 |

(Continued)

FOREIGN PATENT DOCUMENTS

| | | |
|---|---|---|
| JP | 2004349764 A | 12/2004 |
| JP | 2012109914 A | 6/2012 |
| JP | 2012249050 A | 12/2012 |

OTHER PUBLICATIONS

Office Action issued in Japanese Application No. 2016-202188 dated Apr. 11, 2017. English translation provided.

*Primary Examiner* — Scott M Sciacca
(74) *Attorney, Agent, or Firm* — Rossi, Kimms & McDowell LLP (57) ABSTRACT

A communication relay apparatus includes a plurality of LAN ports configured to receive LAN cables respectively, at least one switch configured to switch to any one of a plurality of states, and an aggregator configured to specify a combination of two or more of the plurality of LAN ports in accordance with a state that is designated in the at least one switch, and conduct redundancy or expansion of a communication bandwidth with respect to a communication performed through the LAN cables that are received in the specified LAN ports.

18 Claims, 4 Drawing Sheets

(56) References Cited

U.S. PATENT DOCUMENTS

2015/0295931 A1* 10/2015 Russell ................ H04L 63/101
                                                    726/4
2016/0241464 A1*  8/2016 Modena ................ H04L 45/02
2018/0183663 A1*  6/2018 Teeter ................ H04L 12/4641

* cited by examiner

| MEMORY ID | PHYSICAL SWITCH | | LAN PORT | | | |
|---|---|---|---|---|---|---|
| | 13a | 13b | 11a | 11b | 11c | 11d |
| 1 | OFF | OFF | – | – | – | – |
| 2 | OFF | ON | A | A | – | – |
| 3 | ON | OFF | A | A | B | B |
| 4 | ON | ON | A | A | A | A |

| MEMORY ID | PHYSICAL SWITCH | | LAN PORT | | | | | | | |
|---|---|---|---|---|---|---|---|---|---|---|
| | 13a | 13b | 11a | 11b | 11c | 11d | 11e | 11f | 11g | 11h |
| 1 | OFF | OFF | – | – | – | – | | | | |
| 2 | OFF | ON | A | A | – | – | | | | |
| 3 | ON | OFF | A | A | B | B | | | | |
| 4 | ON | ON | A | A | A | A | | | | |

COMMUNICATION RELAY APPARATUS AND SETTING METHOD

CROSS REFERENCE TO RELATED APPLICATIONS

This application is based on Japanese Patent Application (No. 2016-202188) filed on Oct. 14, 2016, the contents of which are incorporated herein by reference.

BACKGROUND OF THE INVENTION

1. Field of the Invention

The present invention relates to a communication relay apparatus and a setting method thereof.

2. Description of the Related Art

In a network, conventionally, a redundant configuration is employed in order to prevent a communication from being interrupted by a failure of a circuit or an apparatus. Moreover, it is requested to ensure the communication bandwidth. Therefore, a link aggregation function in which an LACP (Link Aggregation Control Protocol) that is defined by IEEE 802.3ad is used has attracted attention as one of means for expanding the communication bandwidth and realizing a redundant configuration. The link aggregation function is a function of logically dealing a plurality of LAN (Local Area Network) ports of a LAN switch as one circuit.

In order to logically deal a plurality of LAN ports as one circuit, it is usual that a LAN switch is set by using a command (for example, see JP-A-2004-349764).

However, there is a problem that it is cumbersome to perform such a setting by using a command.

SUMMARY OF THE INVENTION

The invention has been conducted in order to solve the problem in the prior art. It is an object of the invention to provide a communication relay apparatus and a setting method thereof in which a plurality of LAN ports can be logically dealt as one circuit in an easier manner.

According to the invention, there is provided a communication relay apparatus including:

a plurality of LAN ports configured to receive LAN cables respectively;

at least one switch configured to switch to any one of a plurality of states; and an aggregator configured to specify a combination of two or more of the plurality of LAN ports in accordance with a state that is designated in the at least one switch, and conduct redundancy or expansion of a communication bandwidth with respect to a communication performed through the LAN cables that are received in the specified LAN ports.

According to the present invention, there is also provided a setting method of a communication relay apparatus including at least one switch and a plurality of LAN ports which is configured to receive LAN cables respectively, the setting method including:

switching to any one of a plurality of states by the at least one switch;

specifying a combination of two or more of the plurality of LAN ports in accordance with a state that is designated in the switching process; and conducting redundancy or expansion of a communication bandwidth with respect to a communication performed through the LAN cables that are received in the LAN ports specified in the specifying process.

According to the invention, it is possible to provide a communication relay apparatus in which a plurality of LAN ports can be logically dealt as one circuit in an easier manner and a setting method thereof.

DETAILED DESCRIPTION OF THE EXEMPLARY EMBODIMENTS

Hereinafter, embodiments of the invention will be described with reference to the drawings. The embodiments which will be described below are examples of embodiments of the invention, and the invention is not limited to these embodiments. In the drawings to which the description of the embodiments will refer, identical components or components having similar functions are denoted by the same reference numerals or similar numerals (numerals suffixed with a letter such as a or b), and their duplicate descriptions will be sometimes omitted.

<First Embodiment>

[Configuration of Communication Relay Apparatus]

Figure 1:
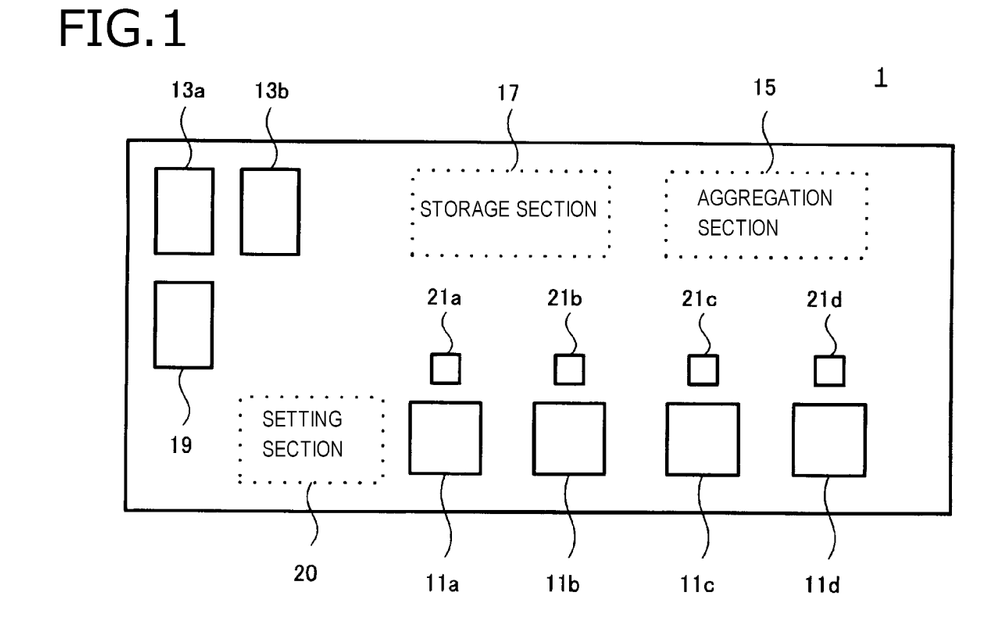
FIG. 1 is a diagram showing a structure example of a communication relay apparatus of an embodiment of the invention.
Figure 2:
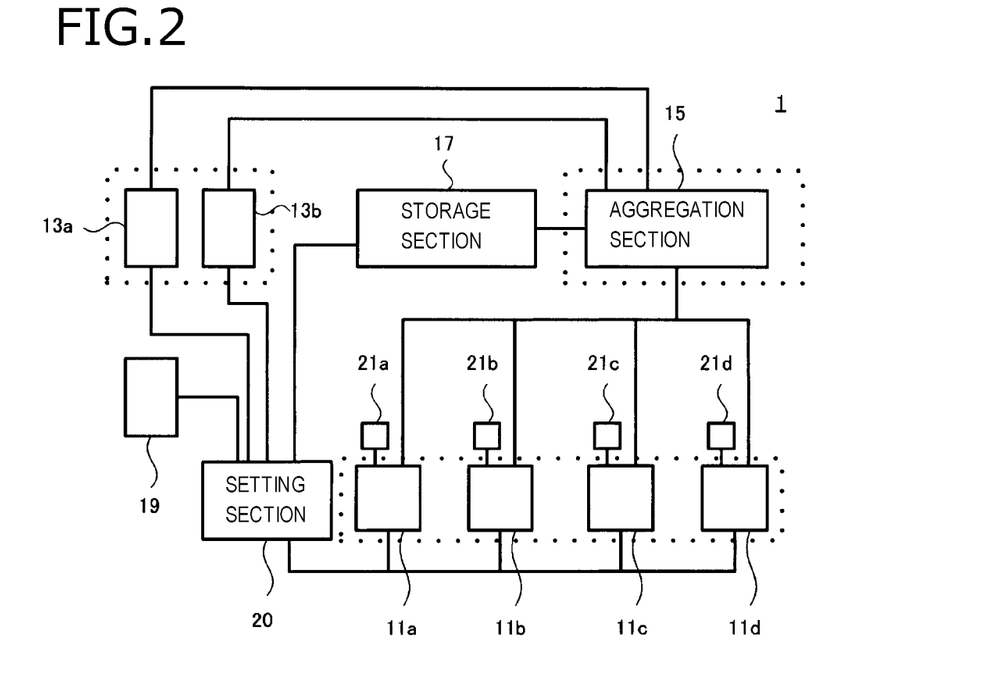
FIG. 2 is a block diagram showing the configuration of the communication relay apparatus of the embodiment of the invention.

A communication relay apparatus 1 will be described with reference to FIGS. 1 and 2. FIG. 1 is a diagram showing a structure example of the communication relay apparatus of the embodiment of the invention, and FIG. 2 is a block diagram showing the configuration of the communication relay apparatus of the embodiment of the invention.

The communication relay apparatus 1 includes a plurality of LAN ports 11a to 11d, switches (physical switch) 13a, 13b, an aggregation section 15 (aggregator), a storage section 17, a switch 19, a setting section 20 (setter), and LEDs (notification section) 21a to 21d. For example, the communication relay apparatus 1 is a network apparatus such as a router or a LAN switch. With respect to components, i.e., the LAN ports 11a to 11d, the switches 13a, 13b, or the LEDs 21a to 21d, in the case where it is not necessary to particularly distinguish the components from one another, the letters suffixed to the reference numeral are omitted, and the components are generally indicated by the LAN ports 11, the switches 13, or the LEDs 21.

A LAN cable can be inserted into any one of the LAN ports 11. Each of the switches 13 can be switched to any one of a plurality of states. Each of the switches 13 has a movable region. The plurality of states are switched in accordance with movements of the switches 13. For example, the switches 13 can be switched between the ON and OFF states. It is a matter of course that the switches 13 may be switched not only between two stages but also among multiple or more than two stages. In the embodiment, each of the switches 13 is configured by a DIP (Dual In-line Package) switch. However, the switches are not limited to DIP switches as far as the states of the switches can be physically switched.

In the embodiment, the number of the switches 13 is two. In accordance with the number of combinations of LAN ports, the switches may consist of one switch or a plurality of or more than two switches. In the case where one switch 13 is used, two kinds of combinations of LAN ports are obtained. In the case of where two switches are used as the switches 13, four kinds of combinations of LAN ports are obtained. In the case of where an n number of switches are used as the switches 13, $2^n$ kinds of combinations of LAN ports are obtained. In the embodiment, the switches 13 are not correlated with the LAN ports 11.

Figure 3:
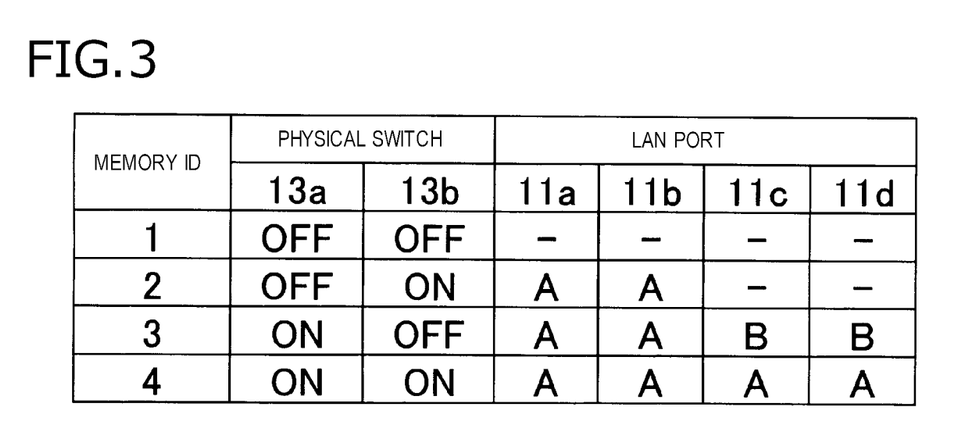
FIG. 3 is a view illustrating a storage section of the communication relay apparatus of the embodiment of the invention.

The storage section 17 stores a table in which the states designated by the switches 13 are made correspond to combinations of LAN ports. Hereinafter, the storage section 17 will be described with reference to FIG. 3. FIG. 3 is a view illustrating the storage section of the communication relay apparatus of the embodiment of the invention. The storage section 17 stores that, when the memory ID is "1", the switch 13a is in the OFF state, the switch 13b is in the OFF state, and there is no combination of the LAN ports. The symbol "-" in FIG. 3 means that the relevant LAN port is not used in a bundle, but independently used. The storage section 17 further stores that, when the memory ID is "2", the switch 13a is in the OFF state, the switch 13b is in the ON state, and the LAN port 11a and the LAN port 11b are combined (bundled) with each other as Group A. Although, in the embodiment, the storage section 17 stores four kinds of combinations, the number of the stored combinations may be different in accordance with the number of the switches 13.

In the case where the combinations stored in the storage section 17 have been determined without setting by the user, it is said that "initialization" has been performed. When the apparatus is initialized in this way, the user can designate the ON/OFF states of the switches, and the combination of LAN ports 11 corresponded to the state designated in the switches is read out from the storage section 17, thereby enabling the plurality of LAN ports 11 to be logically dealt as one circuit. In the case where the user wishes to use the LAN ports 11a, 11b as Group A, and the LAN ports 11c, 11d as Group B, for example, the user is requested only to set the switch 13a to ON, and the switch 13b to OFF.

The storage section 17 includes a storage area which stores programs for realizing the functions of the aggregation section 15 and setting section 20 that will be described later, and application programs for realizing various functions. Examples of the storage section 17 are a magnetic recording medium such as a hard disk, and a nonvolatile memory such as an EEPROM (Electrically Erasable and Programmable Read Only Memory) or a flash memory. The programs may be executable by a computer, and provided in a state where the programs are stored in a computer readable storage medium such as a magnetic storage medium, an optical storage medium, a magnetooptical storage medium, or a semiconductor memory. In this case, the communication relay apparatus 1 may include a device for reading the storage medium. The storage section 17 may be disposed outside the communication relay apparatus 1.

Referring again to FIGS. 1 and 2, the description will be made. In accordance with the state designated in the switches 13, the aggregation section 15 specifies a combination of two or more of the plurality of LAN ports 11, and conducts redundancy or expansion of the communication bandwidth with respect to a communication which is performed through the LAN cables that are inserted into the specified LAN ports. In the example of FIG. 3, when the switch 13a is set to the OFF state, and the switch 13b is set to the ON state, the aggregation section 15 specifies the LAN port combination as the LAN ports 11a, 11b from the corresponding table of the storage section 17, and realizes redundancy or expansion of the communication bandwidth with respect to a communication which is performed through the LAN cables that are inserted into the specified LAN ports 11a, 11b. That is, the aggregation section 15 realizes a function of logically dealing the LAN ports 11a, 11b as one circuit. Here, examples of the realization of redundancy may be not only Link Aggregation using an LACP that is defined by IEEE 802.3ad, but also a method (such as the link redundant) which does not use an LACP that is defined by IEEE 802.3ad.

The setting section 20 writes the correspondence in the table of the storage section 17 while making the state designated in the switches, correspond to a combination of the LAN ports. The setting section 20 operates in the case where the user sets correspondence between the state designated in the switches and a combination of LAN ports. This is applicable also to the switch 19. The operation will be described later in detail with reference to FIG. 4.

The aggregation section 15 and the setting section 20 realize a function of causing a CPU (computer) to execute programs stored in the storage section 17, and performing processes. A part or all of the configuration for realizing the function may be formed not only by software by means of execution of programs, but also by hardware.

The LEDs 21 notify that a LAN cable is inserted into the LAN ports 11. The LEDs 21a to 21d are made correspond to the LAN ports 11a to 11d, respectively.

The structure and configuration of the communication relay apparatus 1 have been described in the above. The minimum configuration of the communication relay apparatus 1 consists of the LAN ports 11, switches 13, and aggregation section 15 which are enclosed by broken lines in FIG. 2. The other configurations in FIG. 2 may be adequately added.

[Setting Mode]

Figure 4:
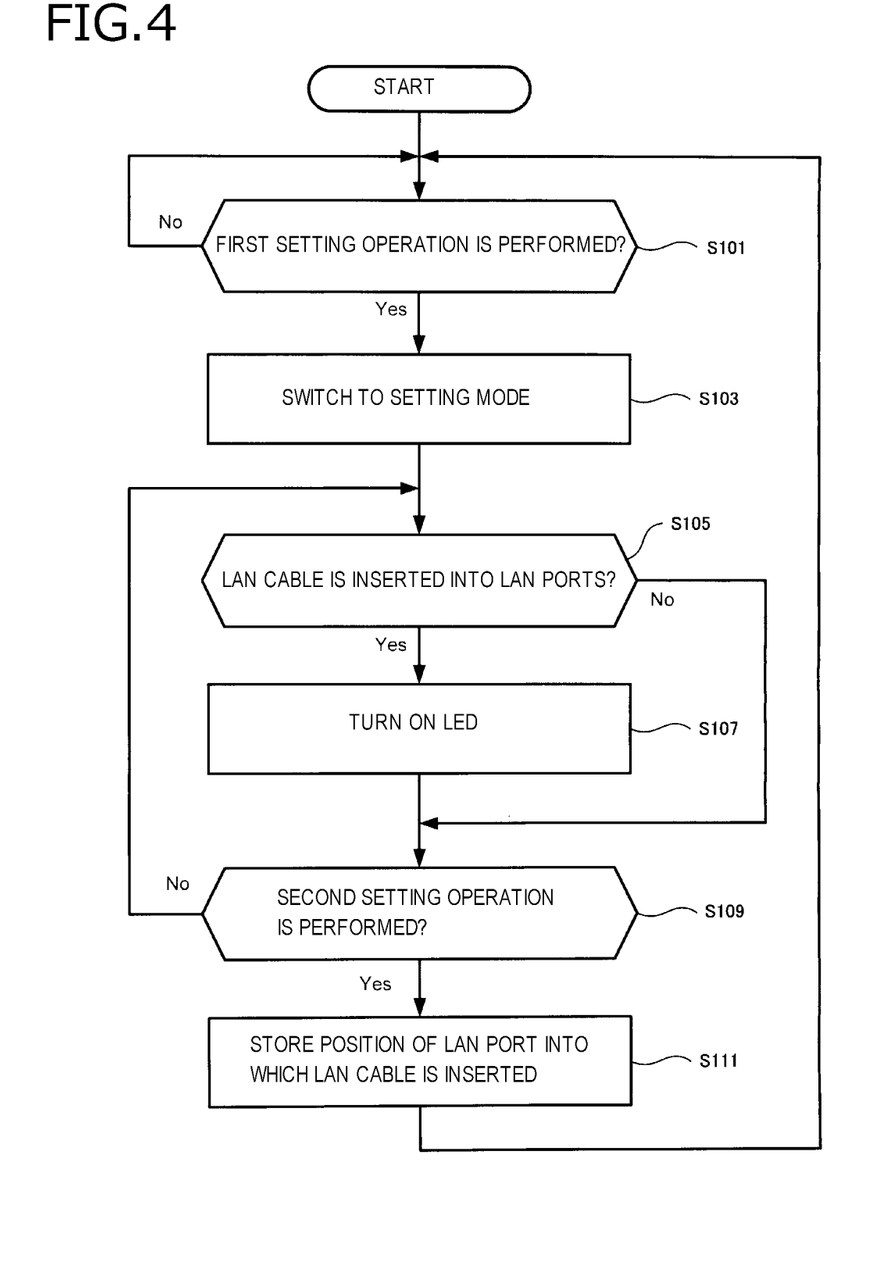
FIG. 4 is a chart showing the operation flow in the case where the user sets a combination of LAN ports in the communication relay apparatus of the embodiment of the invention.

Next, not the initialization, the case where the user oneself sets a combination of LAN ports, i.e., a setting mode will be described with reference to FIG. 4. FIG. 4 is a chart showing the operation flow in the case where the user sets a combination of LAN ports in the communication relay apparatus of the embodiment of the invention. Hereinafter, a case where, in the example of FIG. 3, the LAN ports 11a and 11b are set in the memory ID "2" as Group A will be described.

Firstly, when the communication relay apparatus 1 is powered on, the flow in FIG. 4 is started. Then, it is determined whether the switch 19 is turned ON (the first setting operation is performed) or not (step S101). If the switch 19 is turned ON (Yes in step S101), the communication relay apparatus 1 is switched to the setting mode (step S103). By contrast, if the switch 19 is not turned ON (No in step S101), step S101 is repeated. The memory ID which will be stored in the storage section 17 is determined depending on the designations of the switches 13a and 13b at the timing when the switch 19 is turned ON. This will be described by using the example shown in FIG. 3. In the case where, at the timing when the switch 19 is turned ON, the switch 13*a* is OFF, and the switch 13*b* is ON, the memory ID to be stored is "2".

Then, it is determined whether a LAN cable is inserted into the LAN ports 11 or not (step S105). In the embodiment, the insertion of a LAN cable into the LAN ports 11 is determined depending on whether the communication relay apparatus 1 detects a link-up or not. If a LAN cable is inserted into the LAN ports 11 (Yes in step S105), the LEDs 21 notify of the insertion (step S107). When a LAN cable is inserted into the LAN port 11*a*, for example, the LED 21*a* corresponding to the LAN port 11*a* lights ON. By contrast, if a LAN cable is not inserted into the LAN ports 11 (No in step S105), the process proceeds to step S109.

Next, it is determined whether the switch 19 is turned OFF (the second setting operation is performed) or not (step S109). If the switch 19 is turned OFF (Yes in step S109), the position(s) of the LAN port(s) 11 into which a LAN cable is inserted at this timing is stored (step S111). In the case where LAN cables are inserted respectively into the LAN ports 11*a*, 11*b*, 11*c*, the positions of these LAN ports are stored. When the storing operation has been performed, the process returns to step S101. Even if, at the timing of step S105, a LAN cable has been inserted into the LAN port 11, when the LAN cable is extracted from the LAN port 11 before the OFF operation (second setting operation) of the switch 19, the position of this LAN port 11 is not stored in the storage section 17. By contrast, if the switch 19 is not turned OFF (No in step S109), the process returns to step S105. The operation flow in the setting mode has been described.

<Second Embodiment>

Figure 5:
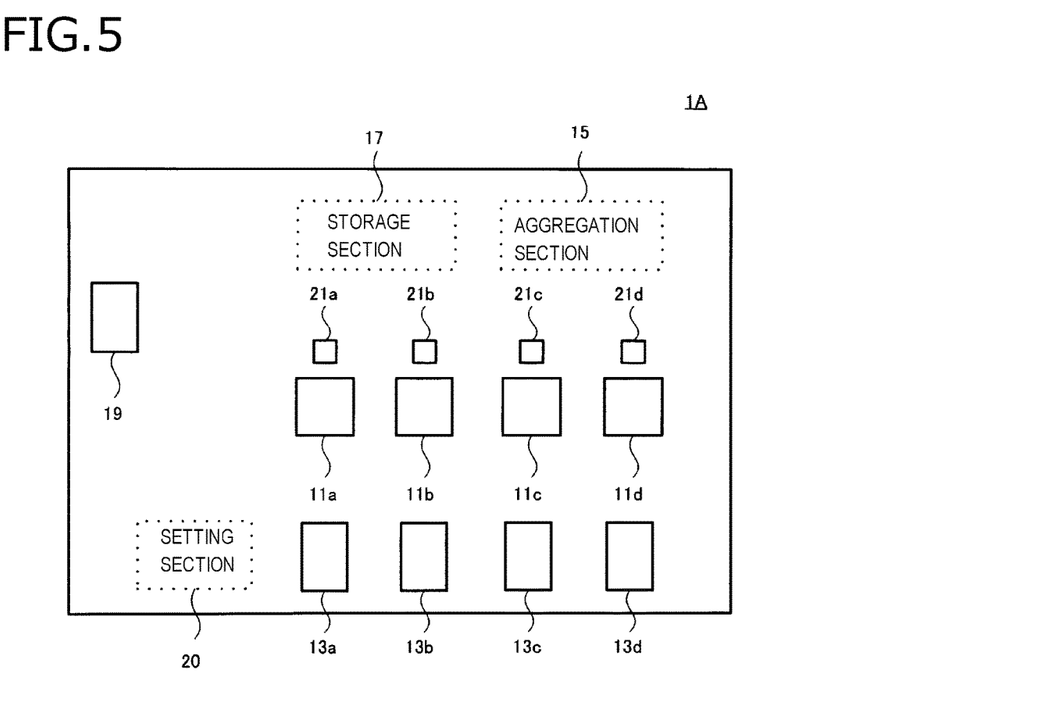
FIG. 5 is a diagram showing a structure example of a communication relay apparatus of another embodiment of the invention.

FIG. 5 is a diagram showing a structure example of a communication relay apparatus of another embodiment of the invention. The communication relay apparatus 1A of the embodiment has a structure which is approximately same as that of the communication relay apparatus 1 of the first embodiment. Unlike the communication relay apparatus 1, in the communication relay apparatus 1A, the switches 13 are disposed for the LAN ports 11, respectively. In other words, the switches 13 are correlated with the LAN ports 11, respectively.

The switches 13*a* to 13*d* are made correspond to the LAN ports 11*a* to 11*d*, respectively. When, in the setting mode, the LAN ports 11*a*, 11*b*, 11*c* are to be set as Group A, for example, the switches 13*a*, 13*b*, 13*c* corresponding respectively to the LAN ports are turned ON, and the switch 13*d* is turned OFF, thereby enabling the setting to be performed.

Also in the embodiment, the effects same as those of the first embodiment are attained. Furthermore, the switches 13 are disposed for the LAN ports 11, respectively, and therefore there is a further effect that the user can easily understand the setting operation in the setting mode.

<Modification 1>

The above embodiments have been described under the assumption that the switch 19 is a DIP switch, the first setting operation is the turning ON of the switch 19, and the second setting operation is the turning OFF of the switch 19. It is a matter of course that the invention is not limited to this. The patterns of the first and second setting operations may be interchanged. Moreover, the method of operating the switch 19 is not limited to the above-described method, as far as the predetermined operation of switching to the setting mode, and that of storing the position of a LAN port in the state where a LAN cable is inserted into the LAN port can be performed. The operation may be an operation of long-pressing a button which can be long-pressed, or that of pressing a button a predetermined number of times.

Also in the modification, the effects same as those of the above-described embodiments are attained.

<Modification 2>

The above embodiments have been described under the assumption that the insertion of a LAN cable into the LAN ports 11 is determined depending on whether the communication relay apparatus 1 detects a link-up or not. It is a matter of course that the invention is not limited to this. The insertion of a LAN cable into the LAN ports 11 may be determined by using a phot-interrupter or another non-contact sensor.

Also in the modification, the effects same as those of the above-described embodiments and Modification 1 are attained.

<Modification 3>

Figure 6:
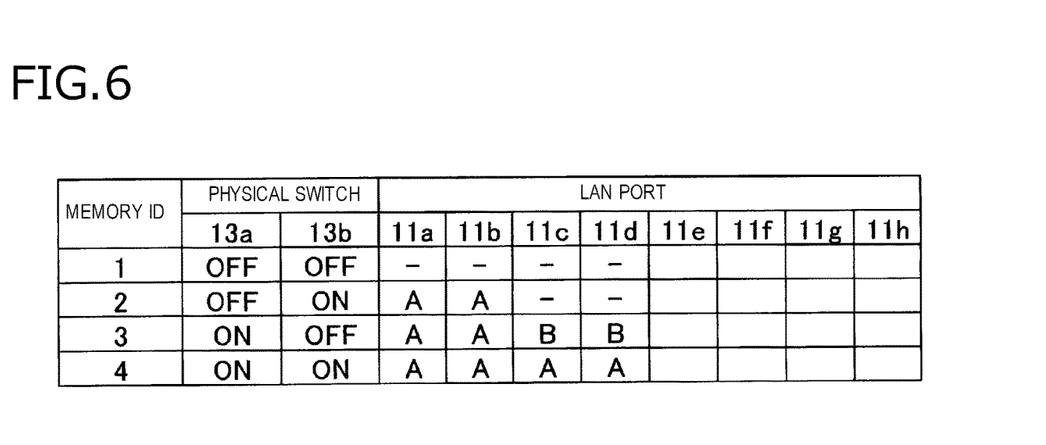
FIG. 6 is a view illustrating a storage section of the communication relay apparatus of the other embodiment of the invention.

The above embodiments have been described under the assumption that the LAN ports 11 are objects which can be combined as a group. It is a matter of course that the LAN ports 11 may include ports which are objects to be combined as a group, and those which are not objects to be combined as a group. In an example shown in FIG. 6, LAN ports 11*e*, 11*f*, 11*g*, 11*h* are ports which are not objects to be combined as a group. A configuration where, depending on the user setting, LAN ports which are objects to be combined as a group can be switched may be possible.

Also in the modification, the effects same as those of the above-described embodiments and the above-described modifications are attained.

<Modification 4>

The above embodiments have been described under the assumption that the switches 13 are physically movable switches such as DIP switches. It is a matter of course that the switches 13 are not limited to this. The switches may be button-type switches which, when pressed and then released, return to the original position. Alternatively, switches which are not physically movable, and in which touching is detected electrically or optically, such as touch sensors may be used. In such a switch, when touching is performed one time, for example, the switch is set to the ON state, and, when further touching is performed one time, the switch is set to the OFF state. When the ON/OFF state is designated, the combination of the LAN ports 11 which is made correspond to the state designated in the switches is read out from the storage section 17, and the plurality of LAN ports 11 can be logically dealt as one circuit.

Also in the modification, the effects same as those of the above-described embodiments and the above-described modifications are attained.

Here, the above embodiments are summarized as follows.

(1) A communication relay apparatus includes:

a plurality of LAN ports configured to receive LAN cables respectively;

at least one switch configured to switch to any one of a plurality of states; and an aggregator configured to specify a combination of two or more of the plurality of LAN ports in accordance with a state that is designated in the at least one switch, and conduct redundancy or expansion of a communication bandwidth with respect to a communication performed through the LAN cables that are received in the specified LAN ports.

(2) For example, in the communication relay apparatus according to the item (1), the at least one switch has a movable region; and one of the plurality of states is switched to another of the plurality of states in accordance with movement of the at least one switch.

(3) For example, the communication relay apparatus according to the item (1) or (2), further includes:

a setter configured to correspond a state designated in the at least one switch to a combination of two or more of the plurality of LAN ports, wherein the aggregator is configured to specify the combination of two or more of the plurality of LAN ports based on the correspondence in the setter.

(4) For example, in the communication relay apparatus according to the item (3), the setter is configured to correspond a state designated in the at least one switch at a timing of switching to a setting mode to a combination of two or more of the LAN ports which receive the LAN cables at a timing of completion of the setting mode.

(5) For example, in the communication relay apparatus according to the item (4), the switching to the setting mode is performed when a switch or a button that is different from the at least one switch is operated.

For example, the communication relay apparatus further includes a notifier configured to notify that the LAN cable is received in the LAN port.

(6) For example, in the communication relay apparatus according to any one of the items (1) to (5), the at least one switch includes a plurality of switches.

For example, in the communication relay apparatus, the at least one switch is disposed for each of the plurality of LAN ports.

(7) For example, in the communication relay apparatus according to any one of the items (1) to (6), the aggregator is configured to specify the combination of two or more of the plurality of LAN ports in accordance with the state that is designated in the at least one switch, based on information which corresponds the state designated in the at least one switch to the combination of two or more of the plurality of LAN ports.

(8) For example, in the communication relay apparatus according to any one of the items (1) to (7), when the state that is designated in the at least one switch is a specific state, the specific state is corresponded to a plurality of combinations of the plurality of LAN ports.

(9) For example, in the communication relay apparatus according to the item (7) or (8), the information which corresponds the state designated in the at least one switch to the combination of two or more of the plurality of LAN ports is configured to correspond a specific state to a first combination and a second combination of the plurality of LAN ports; and the first combination and the second combination of the plurality of LAN ports are combinations using different LAN ports in the plurality of LAN ports.

(10) For example, in the communication relay apparatus according to any one of the items (1) to (9), the switch is a physical switch or a touch switch which electrically or optically detects an operation of a user.

(11) A setting method of a communication relay apparatus including at least one switch and a plurality of LAN ports which is configured to receive LAN cables respectively, includes:

switching to any one of a plurality of states by the at least one switch;

specifying a combination of two or more of the plurality of LAN ports in accordance with a state that is designated in the switching process; and conducting redundancy or expansion of a communication bandwidth with respect to a communication performed through the LAN cables that are received in the LAN ports specified in the specifying process.

(12) For example, in the setting method according to the item (11), the at least one switch has a movable region; and one of the plurality of states is switched to another of the plurality of states in accordance with movement of the at least one switch.

(13) For example, the setting method according to the item (11) or (12), further includes:

corresponding the state designated in the switching process to a combination of two or more of the plurality of LAN ports, wherein the specifying process specifies the combination of two or more of the plurality of LAN ports based on the correspondence in the corresponding process.

(14) For example, the setting method according to the item (13), further includes:

storing a state designated in the at least one switch at a timing of switching to a setting mode;

detecting that any ones of the LAN cables are inserted into the LAN ports during the setting mode; and corresponding the state stored in the storing process to a combination of the LAN ports into which the any ones of the LAN cables are inserted at a timing of completion of the setting mode.

(15) For example, in the setting method according to the item (14), the switching to the setting mode is performed when a switch or a button that is different from the at least one switch is operated.

(16) For example, in the setting method according to any one of the items (11) to (15), the at least one switch includes a plurality of switches.

(17) For example, in the setting method according to any one of the items (11) to (16), the specifying process specifies the combination of two or more of the plurality of LAN ports in accordance with the state that is designated in the at least one switch, based on information which corresponds the state designated in the at least one switch to the combination of two or more of the plurality of LAN ports.

(18) For example, in the setting method according to any one of the items (11) to (17), when the state that is designated in the at least one switch is a specific state, the specific state is corresponded to a plurality of combinations of the plurality of LAN ports.

(19) For example, in the setting method according to the item (17) or (18), the information which corresponds the state designated in the at least one switch to the combination of two or more of the plurality of LAN ports is configured to correspond a specific state to a first combination and a second combination of the plurality of LAN ports; and the first combination and the second combination of the plurality of LAN ports are combinations using different LAN ports in the plurality of LAN ports.

(20) For example, in the setting method according to any one of the items (11) to (19), the switch is a physical switch or a touch switch which electrically or optically detects an operation of a user.

The invention is not limited to the above-described embodiments, and may be adequately changed without departing from the spirit of the invention.

What is claimed is:

1. A communication relay apparatus comprising:
 a plurality of LAN ports configured to receive LAN cables respectively;
 at least one physical switch provided on a body of the communication relay apparatus and being configured to switch to any one of a plurality of states; and
 circuity configured to cause the communication relay apparatus to:

store a state designated in the at least one physical switch at a timing of the communication relay apparatus being switched to a setting mode;

detect that any ones of the LAN cables are inserted into the LAN ports during the setting mode;

correspond the stored state to a combination of two or more of the plurality of LAN ports into which the any ones of the LAN cables are inserted at a timing of completion of the setting mode; and specify the combination of the two or more of the plurality of LAN ports in accordance with the stored state based on the corresponded combination of the two or more of the plurality of LAN ports, and conduct redundancy or expansion of a communication bandwidth with respect to a communication performed through the LAN cables that are received in the specified LAN ports.

2. The communication relay apparatus according to claim 1, wherein:

the at least one physical switch has a movable region; and one of the plurality of states is switched to another of the plurality of states in accordance with movement of the at least one physical switch.

3. The communication relay apparatus according to claim 1, wherein the communication relay apparatus is switched to the setting mode when a switch or a button that is different from the at least one physical switch is operated.

4. The communication relay apparatus according to claim 1, wherein the at least one physical switch includes a plurality of physical switches provided on the body of the communication relay apparatus.

5. The communication relay apparatus according to claim 1, wherein the combination of two or more of the plurality of LAN ports is specified in accordance with the state that is designated in the at least one physical switch, based on information which corresponds the state designated in the at least one physical switch to the combination of two or more of the plurality of LAN ports.

6. The communication relay apparatus according to claim 5, wherein:

the information which corresponds the state designated in the at least one physical switch to the combination of two or more of the plurality of LAN ports is configured to correspond a first specific state to a first combination of the plurality of LAN ports and a second specific state to a second combination of the plurality of LAN ports; and the first combination and the second combination of the plurality of LAN ports are combinations using different LAN ports in the plurality of LAN ports.

7. The communication relay apparatus according to claim 1, wherein when the state that is designated in the at least one physical switch is a specific state, the specific state is corresponded to a plurality of combinations of the plurality of LAN ports.

8. The communication relay apparatus according to claim 1, wherein the at least one physical switch is configured to physically move to detect an operation of a user or is configured to electrically or optically detect the operation of a user.

9. A setting method of a communication relay apparatus including at least one physical switch provided on a body of the communication relay apparatus and a plurality of LAN ports which is configured to receive LAN cables respectively, the setting method comprising:

switching to any one of a plurality of states by the at least one physical switch;

storing a state designated in the at least one physical switch at a timing of switching to a setting mode;

detecting that any ones of the LAN cables are inserted into the LAN ports during the setting mode;

corresponding the state stored in the storing process to a combination of two or more of the plurality of LAN ports into which the any ones of the LAN cables are inserted at a timing of completion of the setting mode;

specifying the combination of the two or more of the plurality of LAN ports in accordance with the state that is stored in the storing process based on the correspondence in the corresponding process; and conducting redundancy or expansion of a communication bandwidth with respect to a communication performed through the LAN cables that are received in the LAN ports specified in the specifying process.

10. The setting method according to claim 9, wherein:

the at least one physical switch has a movable region; and one of the plurality of states is switched to another of the plurality of states in accordance with movement of the at least one physical switch.

11. The setting method according to claim 9, wherein the switching to the setting mode is performed when a switch or a button that is different from the at least one physical switch is operated.

12. The setting method according to claim 9, wherein the at least one physical switch includes a plurality of physical switches provided on the body of the communication relay apparatus.

13. The setting method according to claim 9, wherein the specifying process specifies the combination of two or more of the plurality of LAN ports in accordance with the state that is designated in the at least one physical switch, based on information which corresponds the state designated in the at least one physical switch to the combination of two or more of the plurality of LAN ports.

14. The setting method according to claim 13, wherein:

the information which corresponds the state designated in the at least one physical switch to the combination of two or more of the plurality of LAN ports is configured to correspond a first specific state to a first combination of the plurality of LAN ports and a second specific state to a second combination of the plurality of LAN ports; and the first combination and the second combination of the plurality of LAN ports are combinations using different LAN ports in the plurality of LAN ports.

15. The setting method according to claim 9, wherein when the state that is designated in the at least one physical switch is a specific state, the specific state is corresponded to a plurality of combinations of the plurality of LAN ports.

16. The setting method according to claim 9, wherein the at least one physical switch is configured to physically move to detect an operation of a user or is configured to electrically or optically detect the operation of a user.

17. A communication relay apparatus comprising:

a plurality of LAN ports configured to receive LAN cables respectively;

at least one switch configured to switch to any one of a plurality of states;

an aggregator configured to specify a combination of two or more of the plurality of LAN ports in accordance with a state that is designated in the at least one switch, and conduct redundancy or expansion of a communication bandwidth with respect to a communication performed through the LAN cables that are received in the specified LAN ports; and a setter configured to (i) detect that any ones of the LAN cables are inserted into the LAN ports during a setting mode and (ii) correspond a state designated in the at least one switch and stored at a timing of switching to the setting mode to a combination of the LAN ports into which the any ones of the LAN cables are inserted at a timing of completion of the setting mode.

18. A setting method of a communication relay apparatus including at least one switch and a plurality of LAN ports which is configured to receive LAN cables respectively, the setting method comprising:

switching to any one of a plurality of states by the at least one switch;

specifying a combination of two or more of the plurality of LAN ports in accordance with a state that is designated in the switching process;

conducting redundancy or expansion of a communication bandwidth with respect to a communication performed through the LAN cables that are received in the LAN ports specified in the specifying process;

storing a state designated in the at least one switch at a timing of switching to a setting mode;

detecting that any ones of the LAN cables are inserted into the LAN ports during the setting mode; and corresponding the state stored in the storing process to a combination of the LAN ports into which the any ones of the LAN cables are inserted at a timing of completion of the setting mode.

* * * * *